United States Patent [19]

Hurner

[11] Patent Number: 5,184,797
[45] Date of Patent: Feb. 9, 1993

[54] FISHING ROD HOLDER

[76] Inventor: Erwin E. Hurner, 920 Belsly Blvd. South, Moorhead, Minn. 56560

[21] Appl. No.: 884,474

[22] Filed: May 13, 1992

Related U.S. Application Data

[63] Continuation of Ser. No. 664,321, Mar. 4, 1991, abandoned.

[51] Int. Cl.⁵ .............................................. A01K 97/10
[52] U.S. Cl. .................................... 248/538; 43/21.2; 248/515
[58] Field of Search ............... 248/514, 515, 538, 156, 248/517, 520; 43/21.2, 27.4

[56] References Cited

U.S. PATENT DOCUMENTS

| | | | |
|---|---|---|---|
| 2,851,234 | 9/1958 | Scheifele | 248/538 |
| 2,995,855 | 8/1961 | Bell | 43/21.2 |
| 3,669,390 | 6/1972 | Nielson | 248/538 X |
| 4,231,178 | 11/1980 | Black | 43/21.2 X |
| 4,407,089 | 10/1983 | Miller | 43/21.2 |
| 4,614,323 | 9/1986 | Bauer | 248/515 |
| 4,827,654 | 5/1989 | Roberts | 248/514 X |
| 4,871,099 | 10/1989 | Bogar | 43/21.2 X |

Primary Examiner—J. Franklin Foss
Attorney, Agent, or Firm—Bailey & Hardaway

[57] ABSTRACT

A fishing rod holder for a fishing rod with an open face reel is provided which comprises a tubular rod holder defining a first slot along the longitudinal axis of the tubular rod holder and a second slot communicating transversely from a bottom portion of the first slot in a position transverse to the longitudinal axis of the tubular rod holder.

2 Claims, 1 Drawing Sheet 3,184,797

FISHING ROD HOLDER

This application is a continuation of application Ser. No. 664,321, filed Mar. 4, 1991, now abandoned.

BACKGROUND OF THE INVENTION

This invention relates to fishing rod holder devices and more particularly to a fishing rod holder which can be used to quickly and easily secure a fishing rod with an open face reel to a holder and which can be used to attach a fishing rod to a foundation.

Various types of fishing rod holders exist within the prior art. It is common for such fishing rod holders to be releasably secured to a boat, dock or some other structure.

U.S. Pat. No. 4,871,099 discloses a fishing rod holder comprising a plurality of vertically extending tubular rod holders connected to a plurality of horizontally spaced supports. The top of each rod holder includes a first downwardly and inwardly tapered slot and a second downwardly and inwardly tapered slot diametrically opposed to the first slot.

U.S. Pat. No. 4,919,316 discloses a fishing rod holder for insertion into an existing beverage holder opening in a boat. The holder includes a tubular body member with a flange at its upper end and a tubular receiver secured within the body member.

It is desirable with fishing rod holders to be able to quickly and easily secure a fishing rod with an open face reel into a holder and to likewise remove it. It is also desireable to attach such a fishing rod in its holder to a foundation. Therefore, while the prior art discloses various types of fishing rod holders, much room for improvement exists within the art.

SUMMARY OF THE INVENTION

It is therefore an object of the present invention to provide a novel fishing rod holder which can be used to quickly and easily secure and retain a fishing rod with an open face reel to the holder and likewise remove it.

It is another object of the present invention to provide such a fishing rod holder that can be securely attached to a foundation.

These as well as other objects are accomplished by a fishing rod holder comprising a tubular rod holder defining a first slot in communication with the top of the rod holder and extending a predetermined distance along the longitudinal axis of the rod holder. The tubular rod holder further defines a second slot communicating from the first slot in a position transverse to the longitudinal axis of the rod holder. Each of these slots is adapted to slideably receive an open face reel associated with a fishing rod. This fishing rod holder also includes means for attaching the fishing rod holder to a foundation.

These as well as other objects will become apparent from the following description given with reference to the accompanying drawings.

DETAILED DESCRIPTION

In accordance with this invention it has been found that a fishing rod holder can be provided which can be used to quickly and easily secure and retain a fishing rod with an open face reel to the holder and to likewise remove such a fishing rod from a holder. It has also been found that such a fishing rod holder can be securely attached to a foundation. Further advantages and features will become apparent from a reading of the following description given with reference to the various figures of drawing.

Figure 1:
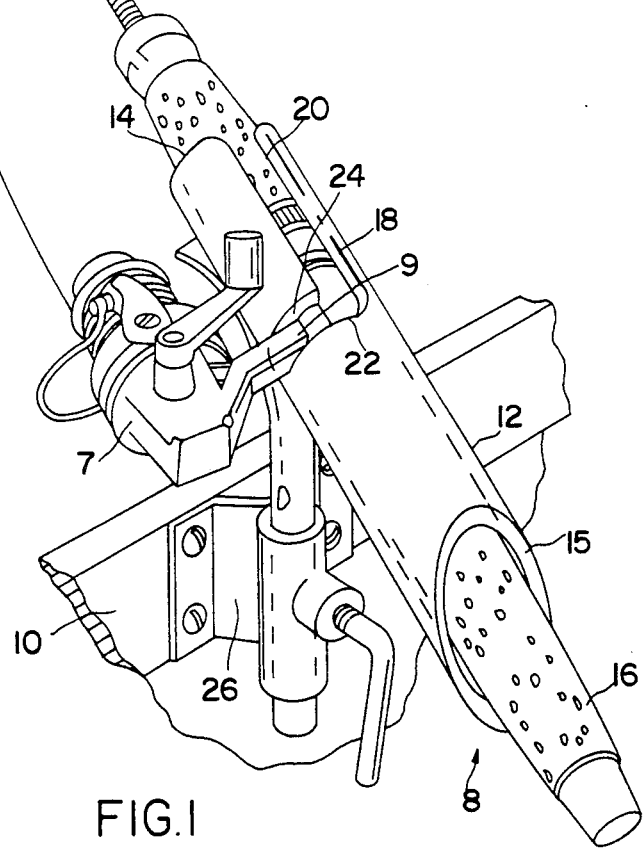
FIG. 1 is a perspective view of a fishing rod with an open face reel secured within a fishing rod holder with the fishing rod holder attached to a foundation.

FIG. 1 is a perspective view of a fishing rod 6 with an open face reel 7 secured within a fishing rod holder 8 with the fishing rod holder 8 attached to a foundation 10. Fishing rod holder 8, as illustrated, comprises a tubular rod holder 12 which has an open top 14 and an open bottom 15. The open top 14 is adapted to receive the handle portion 16 of the fishing rod 6. Tubular rod holder 12 defines a first slot 18 that communicates with open top 14 and extends a predetermined distance along the longitudinal axis of the tubular rod holder 12. First slot 18 has an upper portion 20 and a bottom portion 22, with the upper portion 20 being inwardly tapered so as to better receive an open face reel. Tubular rod holder 12 also defines a second slot 24 which communicates transversely from the bottom portion 22 of the first slot 18 in a position transverse to the longitudinal axis of the tubular rod holder 12. The first slot 18 and second slot 24 of the tubular rod holder 12 are adapted to slideably receive the open face reel 7 associated with the fishing rod 6.

Also illustrated in FIG. 1 is means 26, illustrated as comprising a metal clasp, a metal arm, and a metal plate, for attaching the fishing rod holder 8 to a foundation 10. Foundation 10 is illustrated as being the side of a boat.

Figure 2:
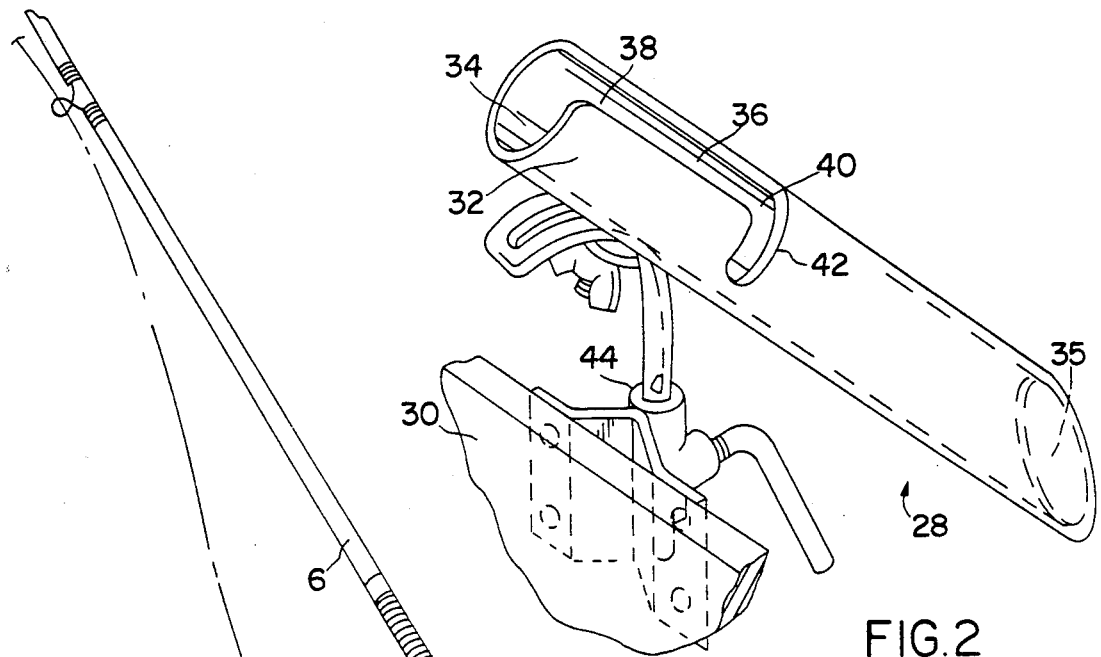
FIG. 2 is a perspective view of a fishing rod holder attached to a foundation.

FIG. 2 is a perspective view of a fishing rod holder 28 attached to a foundation 30. Again, foundation 30 is illustrated as being the side of a boat. Fishing rod holder 28 is comprised of a tubular rod holder 32 having an open top 34 and an open bottom 35. Open top 34 is designed for receiving a handle portion of a fishing rod. A first slot 36 is defined by tubular rod holder 32. This first slot 36 communicates with the open top 34 of the tubular rod holder 32 and extends a predetermined distance along the longitudinal axis of the tubular rod holder 32. First slot 36 has an upper portion 38 and a bottom portion 40, the upper portion 38 communicating with the open top 34 of the tubular rod holder 32 and being inwardly tapered. A second slot 42 is also defined by the tubular rod holder 32 and communicates transversely from the bottom portion of first slot 36 in a position transverse to the longitudinal axis of the tubular rod holder 32. The first slot 36 and second slot 42 defined by tubular rod holder 32 are adapted to slideably receive an open face reel associated with a fishing rod.

Also shown in FIG. 2 as part of fishing rod holder 28 is means 44 for attaching the tubular rod holder 32 to a foundation 30. Means 44, for illustrative purposes only, is shown in FIG. 1 as comprising a metal clasp, a metal arm, and a metal plate. Also for illustration only, foundation 30 is shown as being the side of a boat.

Utilizing the present fishing rod holder 8 (in FIG. 1), a fishing rod 6 with a open face reel 7 associated with it can be quickly and easily inserted into the tubular rod holder 12 so that the handle 16 is received through the open top 14 and open bottom 15 of the tubular rod holder 12. Reels of the type that have an open face have extended arms such as arm 9. It is arms such as arm 9 from an open face reel that are able to slide through the first slot 18 to its bottom portion 22. Once there, the reel 7 and the rod 6 can be rotated so that the arm 9 of the reel 7 slides through the second slot 24. In this manner, the rod 6 and the open face reel 7 are quickly and easily secured to and retained in the tubular rod holder 12 and likewise withdrawn from it.

As illustrated in FIGS. 1 and 2, the fishing rod holder 10 can be attached to a foundation such as the side of a boat, a pier, or even a pole to be driven into the sand on a beach or at some other body of water.

It is thus seen that the invention provides a novel fishing rod holder which can be used to quickly and easily secure and retain a fishing rod with an open face reel to the holder. It is further seen that the present invention provides such a fishing rod holder that can be securely attached to a foundation. Many variations are apparent to those of skill in the art, and such variations are embodied within the spirit and scope of the present invention as measured by the following appended claims.

That which is claimed:

1. A fishing rod holder comprising:
   a tubular rod holder having an open top and an open bottom for receiving a handle portion of a fishing rod therethrough, said fishing rod having an open face reel thereon;
   a first slot defined by said tubular rod holder;
   said first slot having an upper portion and a bottom portion and said first slot extending a predetermined distance along the longitudinal axis of said tubular rod holder;
   said upper portion of said first slot being inwardly tapered and communicating with said open top;
   a second slot defined by said tubular rod holder;
   said second slot communicating transversely from said bottom portion of said first slot in a position transverse to the longitudinal axis of said tubular rod holder;
   said first and second slots of said tubular rod holder being adapted to slidably receive said open face reel associated with said fishing rod;
   said tubular rod holder fixedly attached to an attachment arm; said attachment arm adapted to attach to a foundation.

2. The fishing rod holder according to claim 1 wherein said attachment arm comprises an arcuate surface to which said tubular rod holder is attached, whereby said tubular rod holder can be fixedly attached at various positions on said arcuate surface.

* * * * *